US011954764B2

(12) United States Patent
Nguyen

(10) Patent No.: US 11,954,764 B2
(45) Date of Patent: Apr. 9, 2024

(54) VIRTUAL BACKGROUND IN A COMMUNICATION SESSION WITH DYNAMIC CHROMA KEY REFRAMING

(71) Applicant: Zoom Video Communications, Inc., San Jose, CA (US)

(72) Inventor: Thanh Le Nguyen, Belle Chasse, LA (US)

(73) Assignee: Zoom Video Communications, Inc., San Jose, CA (US)

(*) Notice: Subject to any disclaimer, the term of this patent is extended or adjusted under 35 U.S.C. 154(b) by 110 days.

(21) Appl. No.: 17/555,369

(22) Filed: Dec. 17, 2021

(65) Prior Publication Data

US 2023/0196637 A1 Jun. 22, 2023

(51) Int. Cl.
| | |
|---|---|
| G06T 11/00 | (2006.01) |
| G06T 7/11 | (2017.01) |
| G06T 7/13 | (2017.01) |
| G06T 7/90 | (2017.01) |
| H04L 65/75 | (2022.01) |
| H04N 5/262 | (2006.01) |

(52) U.S. Cl.
CPC .............. *G06T 11/001* (2013.01); *G06T 7/11* (2017.01); *G06T 7/13* (2017.01); *G06T 7/90* (2017.01); *H04L 65/75* (2022.05); *H04N 5/2628* (2013.01); *G06T 2200/24* (2013.01); *G06T 2207/10016* (2013.01); *G06T 2207/10024* (2013.01); *G06T 2207/20132* (2013.01); *G06T 2207/30196* (2013.01)

(58) Field of Classification Search
CPC . G06T 11/001; G06T 7/11; G06T 7/13; G06T 7/90; G06T 11/00; H04L 65/75; H04N 5/2628
See application file for complete search history.

(56) References Cited

U.S. PATENT DOCUMENTS

| | | | | |
|---|---|---|---|---|
| 5,400,081 | A | * | 3/1995 | Chaplin .................... H04N 9/75 348/592 |
| 8,339,418 | B1 | * | 12/2012 | Nesmith ................. G06T 15/50 345/633 |
| 8,405,780 | B1 | * | 3/2013 | Schaem .................... H04N 9/75 348/576 |
| 2008/0068473 | A1 | * | 3/2008 | Ryckman ............... G10H 1/365 348/E5.022 |

(Continued)

*Primary Examiner* — Olisa Anwah
(74) *Attorney, Agent, or Firm* — Young Basile Hanlon & MacFarlane, P.C.

(57) ABSTRACT

Methods and systems provide for providing a virtual background within a communication session using dynamic chroma key reframing. In one embodiment, a method displays a user interface including at least one video feed corresponding to a participant of the communication session. The method receives a request to enable a selected or provided virtual background using chroma keying. The method then determines a background layer of the video feed. The method also determines edges for the background layer. Next, the method crops and reframes the video feed around the edges of the background layer. The method then removes the background layer from the video feed, and adds the selected or provided virtual background to the background layer of the video feed. Finally, the method displays the video feed within the communication session.

20 Claims, 8 Drawing Sheets

(56) References Cited

U.S. PATENT DOCUMENTS

| | | | | |
|---|---|---|---|---|
| 2012/0140019 A1* | 6/2012 | Jung | ........................ | G06T 11/00 |
| | | | | 348/14.02 |
| 2014/0325396 A1* | 10/2014 | Sterman | ................. | H04N 7/147 |
| | | | | 715/756 |
| 2018/0020168 A1* | 1/2018 | Friedman | ........... | H04N 21/4786 |
| 2019/0355177 A1* | 11/2019 | Manickam | .............. | G06F 30/13 |
| 2020/0195860 A1* | 6/2020 | Shirakyan | .............. | H04N 23/50 |
| 2020/0267334 A1* | 8/2020 | Cyrus | .................. | H04N 5/2226 |
| 2021/0258513 A1* | 8/2021 | Fieldman | .............. | G11B 27/036 |
| 2022/0256116 A1* | 8/2022 | Chu | ...................... | H04N 23/661 |
| 2023/0117381 A1* | 4/2023 | Geng | .................... | H01L 33/507 |
| | | | | 257/72 |

\* cited by examiner

VIRTUAL BACKGROUND IN A COMMUNICATION SESSION WITH DYNAMIC CHROMA KEY REFRAMING

FIELD

The present application relates generally to digital communication, and more particularly, to systems and methods for providing a virtual background within a communication session using dynamic chroma key reframing.

SUMMARY

The appended claims may serve as a summary of this application.

BRIEF DESCRIPTION OF THE DRAWINGS

The present application relates generally to digital communication, and more particularly, to systems and methods providing for dynamically generating a note with captured content from a communication session.

The present disclosure will become better understood from the detailed description and the drawings, wherein.

DETAILED DESCRIPTION OF THE DRAWINGS

Figure 1A:
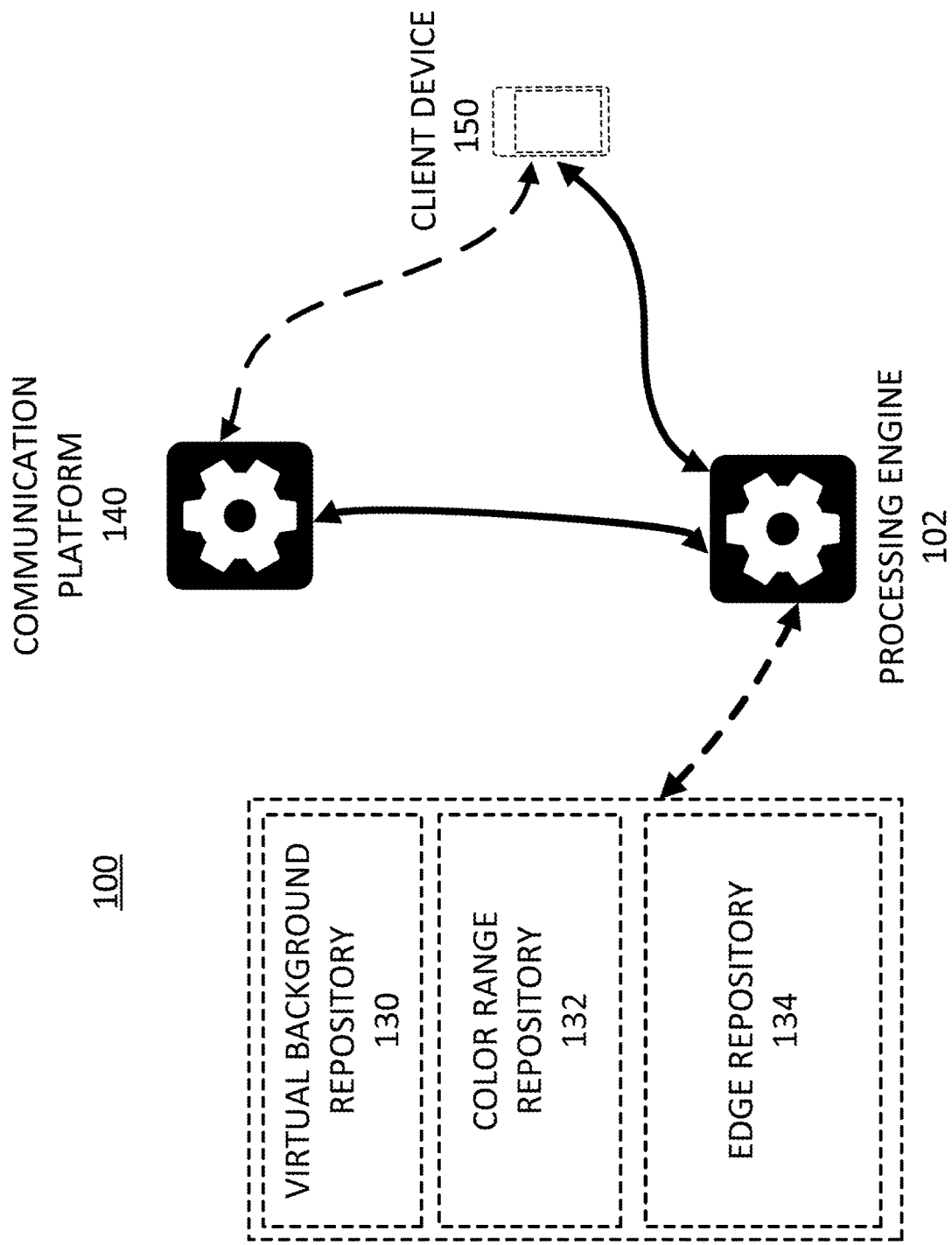
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

During remote video communication sessions, such as video-based conferences or work meetings, users want to be able to appear with better virtual backgrounds. The optimal way to do this today is to use a solid color background, such as green, to produce a so-called "green screen effect" employing chroma key techniques. Chroma keying refers to the techniques of layering or compositing two images based on color hues. In some cases, it involves removing a solid color background—any solid color background can potentially be used—by extracting that background color layer from a foreground layer. Then the background layer can be filled in with a different image or video, such as a virtual background. In some cases, the background layer used can be any one of: a solid color, shades of that solid color, repeated patterns, colors, or shapes. Using such techniques, video conferencing software can replace the solid color background with a virtual background without having to use a significant amount of processing power or memory. This greatly improves the look of a virtual background behind a participant. In contrast, when using a virtual background today without employing a solid color background and chroma key techniques, many details are lost because the system must perform additional rendering. This often causes issues with parts of a user, such as the user's hands or a portion of their face, being removed inadvertently. If the end user is moving around, the edges of the user can become pixelated. Thus, a solid chroma key background is important to making virtual backgrounds appear as expected in a participant's video feed.

One major issue with this approach, however, is that lower end cameras, such as, e.g., smartphone cameras, lack the ability to dynamically or automatically zoom into a solid color backdrop of a participant. This forces the user to either purchase a more expensive camera with auto-zoom features, or purchase a larger green screen or other solid colored screen or backdrop. The camera may be, for instance, a PTZ camera with the ability to automatically zoom into the participant. This often does not work from mobile devices without significant setup. In addition, each time the camera starts, the viewing angle will have to be set by the user. Meanwhile, a larger screen or backdrop is often not portable or manageable within the room the participant is using, since they must typically be permanently installed.

Another option is to use a separate third-party software application to digitally zoom and crop the video feed before the start of each meeting. However, the user would have to set up the desired camera view each time they start a meeting. Most end user cameras also do not have internal storage to save the settings. It is often a time-intensive and cumbersome process to use such third-party software to frame the viewing area correctly prior to joining a meeting.

An additional problem is that users who often travel and stay in hotels or other locations outside of their office cannot take advantage of a green screen. A user presenting at a video conference with the backdrop of a hotel room may be seen by others as lacking in a professional appearance and environment.

Thus, there is a need in the field of digital communication tools and platforms to create new and useful systems and methods for providing a virtual background within a communication session using dynamic chroma key reframing. This would allow users to make use of virtual backgrounds using chroma key techniques, without needing to use a large, awkward green screen or purchase an expensive camera. Instead, such a solution would allow the user to utilize a much smaller screen with solid color, repeated pattern, or similar detectable aspects, and would provide a much smoother virtual background experience. Mobile or travel-heavy users would also be able to take advantage of a better virtual background experience without the need to specifically set up a green screen, for example, as long as there is a solid color backdrop which can be used in their location.

In one embodiment, a method displays, for each of a number of participants within a communication session, a user interface (hereinafter "UI") including at least one video feed corresponding to a participant of the communication session. The method receives a request to enable a selected or provided virtual background using chroma keying. The method then determines a background layer of the video feed. The method also determines edges for the background layer. Next, the method crops and reframes the video feed around the edges of the background layer. The method then removes the background layer from the video feed, and adds the selected or provided virtual background to the background layer of the video feed. Finally, the method displays the video feed within the communication session.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., a virtual background repository 130, color range repository 132, and/or an edge repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
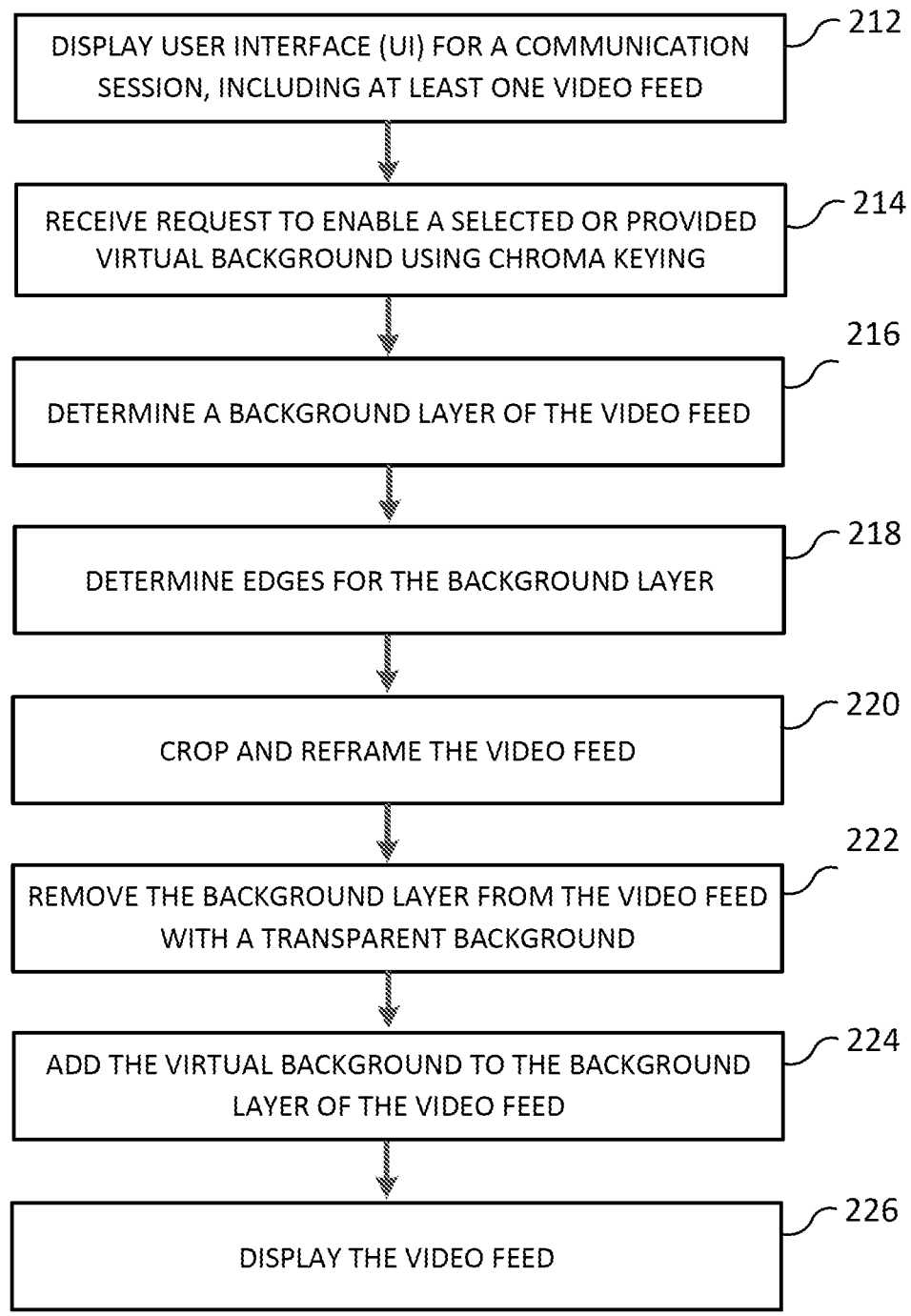
FIG. 2 is a flow chart illustrating an exemplary method that may be performed in some embodiments.

In an embodiment, the processing engine 102 may perform the exemplary method of FIG. 2 or other method herein and, as a result, provide a virtual background within a communication session with chroma key reframing. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include one or more of a virtual background repository 130, color range repository 132, and/or edge repository 134. The optional repositories function to store and/or maintain, respectively, virtual backgrounds which can be selected or provided by a user to replace their current background; determined color ranges for backgrounds of users; and determined edges for those backgrounds. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
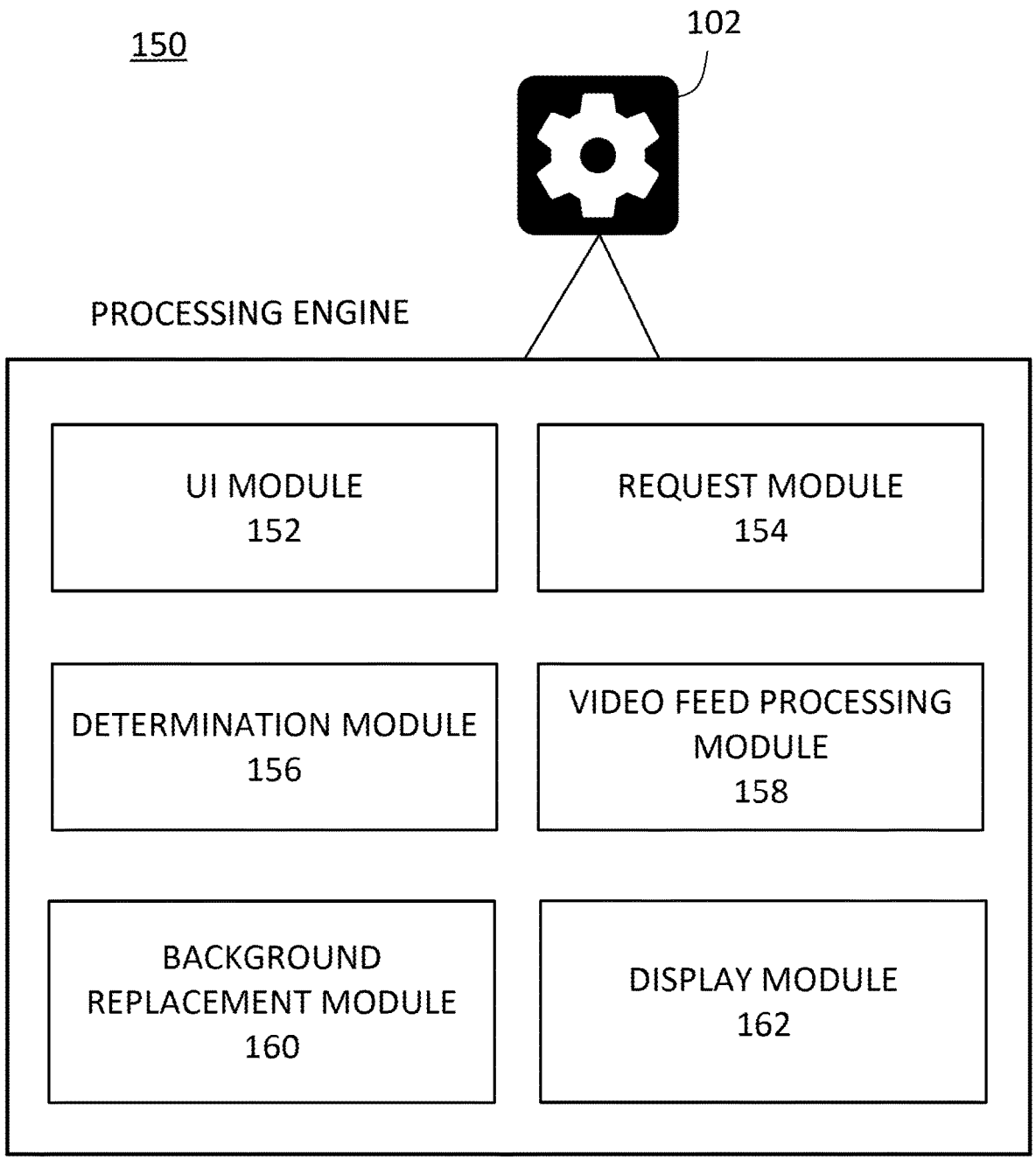
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

UI module 152 functions to display, for each of a number of participants within a communication session, a UI consisting of at least one video feed corresponding to a participant of the communication session. In some embodiments, participant windows, at least some of which contain additional video feeds of participants, are also included in the UI, as well as UI elements for selection options and navigating within the UI, as will be described further below.

Request module 154 functions to receive a request to enable a selected or provided virtual background using chroma keying.

Determination module 156 functions to determine a background layer of the video feed, as well as to determine edges for the background.

Video feed processing module 158 functions to crop and reframe the video feed around the edges of the background layer.

Background replacement module 160 functions to remove the background layer of the video feed, and add the selected or provided virtual background to the background layer of the video feed.

Display module 162 functions to display the video feed within the communication session.

The above modules and their functions will be described in further detail in relation to an exemplary method below.

FIG. 2 is a flow chart illustrating an exemplary method that may be performed in some embodiments.

At step 212, the system displays a UI for a communication session. The UI includes at least a video feed corresponding to a participant of the communication session. This participant may be the user who is viewing the UI for the communication session on their local client device. In some embodiments, the video feed is generated via a mobile device affixed to a tripod or mobile device stand. That is, the participant may be viewing the UI on a client device that is a mobile device, such as a smartphone with a built-in camera. The mobile device with built-in camera then is used to generate the video feed in real-time which is displayed for other participants of the communication session. In some embodiments, mobile devices with a fixed perspective for video capturing can be used in this way for applying the green screen effect or chroma keying in later steps.

In some embodiments, the UI additionally includes at least a number of participant windows corresponding to the number of participants, and additional video feeds for each of at least a subset of the participants. In some embodiments, the video for a participant is displayed within the corresponding participant window for that participant.

In some embodiments, the system connects participants to a live communication stream via their respective client devices. The communication stream may be any "session" (such as an instance of a video conference, webinar, informal chat session, or any other suitable session) initiated and hosted via the communication platform, for remotely communicating with one or more users of the communication platform, i.e., participants within the communication session. Participants are connected on user devices, and are associated with user accounts within the communication platform.

The UI for the communication session is displayed on the client device of each participant. In some embodiments, the UI appears different for different participants, or has different UI elements included for different participants depending on their user permissions, access levels (e.g., a premium-tier business user account as compared to a free-tier user account), or other aspects that may differentiate one participant from another within the communication platform. In various embodiments, the UI is configured to allow the participant to, e.g., navigate within the video communication session, engage or interact with one or more functional elements within the video communication session, control one or more aspects of the video communication session, and/or configure one or more settings or preferences within the video communication session.

In some embodiments, the system receives a number of video feeds depicting imagery of a number of participants, the video feeds each having multiple video frames. In some embodiments, the video feeds are each generated via an external device, such as, e.g., a video camera or a smartphone with a built-in video camera, and then the video content is transmitted to the system. In some embodiments, the video content is generated within the system, such as on a participant's client device. For example, a participant may be using her smartphone to record video of herself giving a lecture. The video can be generated on the smartphone and then transmitted to the processing system, a local or remote repository, or some other location. In some embodiments, one or more of the video feeds are pre-recorded and are retrieved from local or remote repositories. In various embodiments, the video content can be streaming or broadcasted content, pre-recorded video content, or any other suitable form of video content. The video feeds each have multiple video frames, each of which may be individually or collectively processed by the processing engine of the system.

In some embodiments, the video feeds are received from one or more video cameras connected to a client device associated with each participant. Thus, for example, rather than using a camera built into the client device, an external camera can be used which transmits video to the client device, or some combination of both.

In some embodiments, the participants are users of a communication platform, and are connected remotely within a virtual communication room generated by the communication platform. This virtual communication room may be, e.g., a virtual classroom or lecture hall, a group room, a breakout room for subgroups of a larger group, or any other suitable communication room which can be presented within a communication platform. In some embodiments, synchronous or asynchronous messaging may be included within the communication session, such that the participants are able to textually "chat with" (i.e., sends messages back and forth between) one another in real time.

In some embodiments, the UI includes a number of selectable UI elements. For example, one UI may present selectable UI elements along the bottom of a communication session window, with the UI elements representing options the participant can enable or disable within the video session, settings to configure, and more. For example, UI elements may be present for, e.g., muting or unmuting audio, stopping or starting video of the participant, sharing the participant's screen with other participants, recording the video session, and/or ending the video session.

At least a portion of the UI displays a number of participant windows. The participant windows correspond to the multiple participants in the video communication session. Each participant is connected to the video communication session via a client device. In some embodiments, the participant window may include video, such as, e.g., video of the participant or some representation of the participant, a room the participant is in or virtual background, and/or some other visuals the participant may wish to share (e.g., a document, image, animation, or other visuals). In some embodiments, the participant's name (e.g., real name or chosen username) may appear in the participant window as well. One or more participant windows may be hidden within the UI, and selectable to be displayed at the user's discretion. Various configurations of the participant windows may be selectable by the user (e.g., a square grid of participant windows, a line of participant windows, or a single participant window). In some embodiments, the participant windows are arranged in a specific way according to one or more criteria, such as, e.g., current or most recent verbal participation, host status, level of engagement, and any other suitable criteria for arranging participant windows. Some participant windows may not contain any video, for example, if a participant has disabled video or does not have a connected video camera device (e.g. a built-in camera within a computer or smartphone, or an external camera device connected to a computer).

At step 214, the system receives a request from one of the participants to enable a selected or provided virtual background using chroma keying. In some embodiments, this request to enable a selected or provided virtual background is initiated by the participant interactively selecting a UI element for choosing a virtual background within a settings UI. For example, a participant within a UI of the communication platform may navigate to a settings UI for selecting settings for communication sessions. Within the settings UI, the participant may then navigate to a "Background & Filters" section. Within that section, there may be an option for the participant to select a virtual background from a number of predefined options, or, in some embodiments, to provide his own virtual background by, e.g., uploading a file in compatible format to be used as a virtual background. Upon the user selecting or providing the virtual background of his choice, he may also be presented with an option to select "I have a green screen" or similar. With the virtual background selected or provided as well as the option selected that the user has a green screen or wishes to use chroma keying, the system then receives the request to enable the selected or provided virtual background using chroma keying. An example of a settings UI that includes such options is described below with respect to FIG. 3B.

At step 216, the system determines a background layer of the video feed. In some embodiments, the system determines the background layer of the video feed by detecting the background from one or more frames of the video feed. This detection can include determining which aspects of the video feed represent the participant, which aspects of the video feed represent the background layer behind the participant, and separating the two to isolate just the background layer. In some embodiments, rather than the system automatically detecting the background layer in this fashion, the system may instead provide UI elements asking the user to select the background layer manually. In some embodiments, this manual selection of the background layer can include merely clicking on a representative section of the background layer, with the system automatically detecting the rest of the background layer based on this representative section. In other embodiments, the manual selection can include dragging or creating boundaries around the participant manually in order to separate out the participant from the background layer. Thus, in various embodiments, the background layer can be determined with manual input from the user or can be determined automatically with minimal or no input from the user.

In various embodiments, determining the background layer of the video feed can include detecting one or more of a solid continuous color, a color gradient, one or more repeated patterns, one or more shapes, or any other suitable detectable aspects within a background layer. For purposes of chroma keying, the background need not be only a solid color, such as in a green screen. The background can additionally or alternatively include repeating patterns, recognizable shapes, gradients of colors rather than solid colors, and more.

In some embodiments where the background is a solid continuous color or color gradient, determining the background includes determining a color range for the background layer. In some embodiments, this involves, first, receiving, via a color selection UI element, a selection of a solid color chosen from the background layer of the video feed, then determining a color range for the background layer based on the selection of the solid color. For example, a participant may be presented with a color selection UI which asks the user to select a representative section of the background layer with a representative solid color. Upon the using doing so, the system then determines the color range for the background layer based on the representative solid color. In some embodiments, the system determines the color range based on the representative solid color as well as additional detected colors of the background layer which may be darker or lighter shades of that solid color. In some embodiments, the system detects the color range for the background layer automatically, based on the colors of the determined background layer of the video feed. Thus, in various embodiments, the color range can be determined with manual input from the user or can be determined automatically with minimal or no input from the user.

At step 218, the system determines a number of edges for the background layer. The edges for the background layer represent the boundaries of the background layer which the system will be removing as well as the boundaries of the selected virtual background which will be added to the background layer in later steps. In some embodiments, the system determines the edges for the background layer by detecting the edges based on a determined color range, repeated pattern, recognizable shapes, or other aspects of the determined background layer. That is, the background layer will be detected by the system based on what the pattern, shape, solid color across an accepted color range, or other aspects for the determined background layer are. For example, if a green screen fills up some of, but not all of the background layer behind the participant, then the system will detect the edges of the green screen but not the edges of the entire background layer, because only the edges of the green screen fit within the accepted color range.

In some embodiments, the system determines the edges for the background layer by receiving, via an edge selection UI element, a selection of the edges for the background layer. For example, the system may present to a user an edge selection UI screen, with elements which allow the user to drag markers representing edges of the background layer, such as the edges of the user's green screen. Thus, the user can move the edge elements to the corners of the user's green screen backdrop manually, then submit them as edges. The system will thus determine the edges based on these manual user selections of where the edges are located.

In some embodiments where the background is a solid color or color gradient, the system determines the color range for the background layer and/or the edges of the background layer by detecting one or more color gradients within the background layer. These color gradients represent colors which vary continuously across the background layer, producing smooth color transitions. The system automatically detects such color gradients, and determines a color range based on them. When the continuity of the smooth colors is broken, then the system determines that the colors outside of the gradient do not fall within an accepted color range. Similarly, when the continuity of the smooth colors is broken, then the system determines that the colors immediately outside of the gradient represent the beginning of an edge of the background layer with solid color.

At step 220, the system crops and reframes the video feed around the edges of the background layer. In some embodiments, the system crops and reframes the video feed such that the background layer represents a solid color across the acceptable color range, with no color irregularities beyond this range. Thus, the video feed appears as though only the solid color background layer is the entire background layer behind the participant up to the edges of the available viewing window. An example of this is described below with respect to FIG. 3C.

In some embodiments, the system replaces one or more color irregularities or incongruities in the background layer with colors selected from the determined color range. In some embodiments, the system can thus fill in all non-solid color areas of the background layer with solid colors from within the acceptable color range in such a way that the background layer all appears to be a solid color with seamless gradients of the color appearing up to the edges of the available viewing window.

In some embodiments, reframing the video feed involves at least the system automatically zooming into the video feed so that the edges of the video feed correspond to the determined edges of the background layer. Thus, the background layer fills up all of the available viewing window of the video feed. After performing the auto-zooming, the system then includes only this specific auto-zoomed portion within the background layer. In some embodiments, the system can direct the physical camera to automatically zoom in while capturing the video feed so that the edges of the video feed correspond to the determined edges of the background layer. That is, rather than digitally zooming in a post processing stage after the video feed has been captured, the camera itself can zoom in to a specific region when producing the video feed.

In some embodiments, reframing the video feed involves at least the system panning within the frame of the video feed. In some instances, cropping and auto-zooming may not be sufficient, as the participant will not be centered within the frame. In order to center the participant within the frame, the system automatically pans left or right until the participant is centered within the frame.

At step 222, the system removes the background layer of the video feed. In some embodiments, the system does this by first determining an outline around the participant within the video feed, and then removing all of the background layer outside of the outline. In some embodiments, the outline was already determined in an earlier step in the process of determining the background layer, color range of the background layer, and/or edges of the background layer. At step 224, the system adds the selected virtual background to the background layer of the video feed. Once the determined background layer is removed from the video feed in step 222, the system then adds the selected or provided virtual background to the background layer in the video feed, essentially replacing the determined background layer with the selected or provided virtual background. The virtual background which the participant selected or provided in step 214 is applied. In some embodiments, the system performs a check to verify that the virtual background has been neatly applied with no errors or inconsistencies.

At step 226, the system displays the video feed within the communication session. If the video feed was previously and is currently being displayed to other participants within their respective UIs in the communication session, that video feed is updated in real time to include the selected or provided virtual background within the background layer of the video feed. In some embodiments, the participant may first be able to see a preview of how the virtual background will appear prior to enabling it to be viewed by other participants.

Figure 3A:
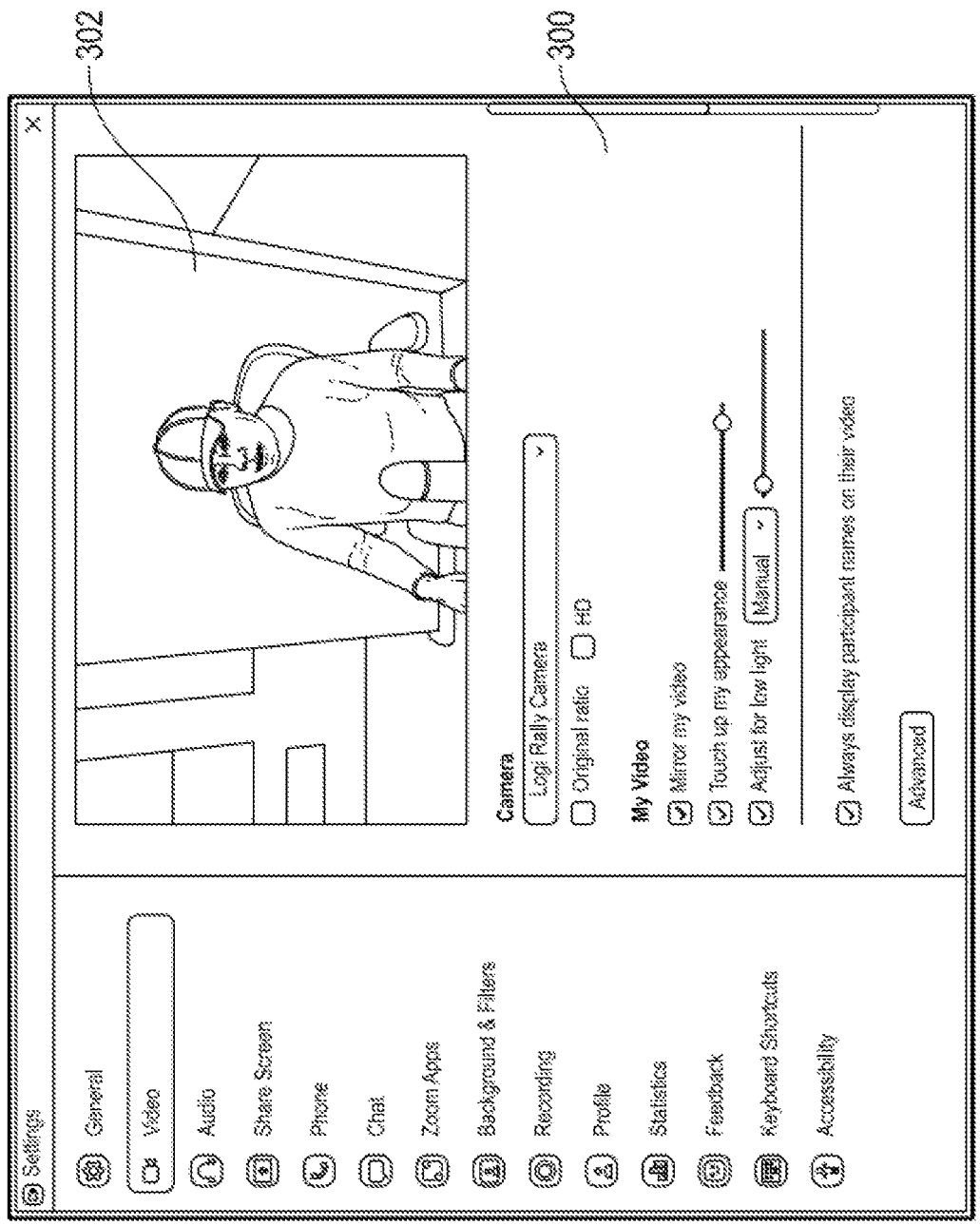
FIG. 3A is a diagram illustrating one example embodiment of a UI for selecting video preferences for a communication session, according to some embodiments.

FIG. 3A is a diagram illustrating one example embodiment of a UI for selecting video preferences for a communication session, according to some embodiments.

The illustration depicts a settings UI window 300 that a particular participant is viewing on a screen of the participant's client device. A preview window 302 is displayed within the UI, representing a preview of how the participant's video feed will appear for other participants if the user accepts changes within the settings UI. A number of tabs are shown on the left which can be selected to navigate to other sections of the settings UI.

Within the preview window, the participant appears to have a green screen backdrop set up behind himself. While this is one way to apply a green screen or chroma keying effect, it is not the only way. Other methods can include, e.g., the participant positioning himself before the camera such that a solid colored wall appears behind him. This may potentially be any solid color. Thus, even a solid off-white wall behind the participant would be enough to be used for green screen or chroma key techniques to be applied (such as, for example, when the participant is broadcasting from a hotel room and must use the available environment in the hotel room to apply a green screen or chroma key effect).

Figure 3B:
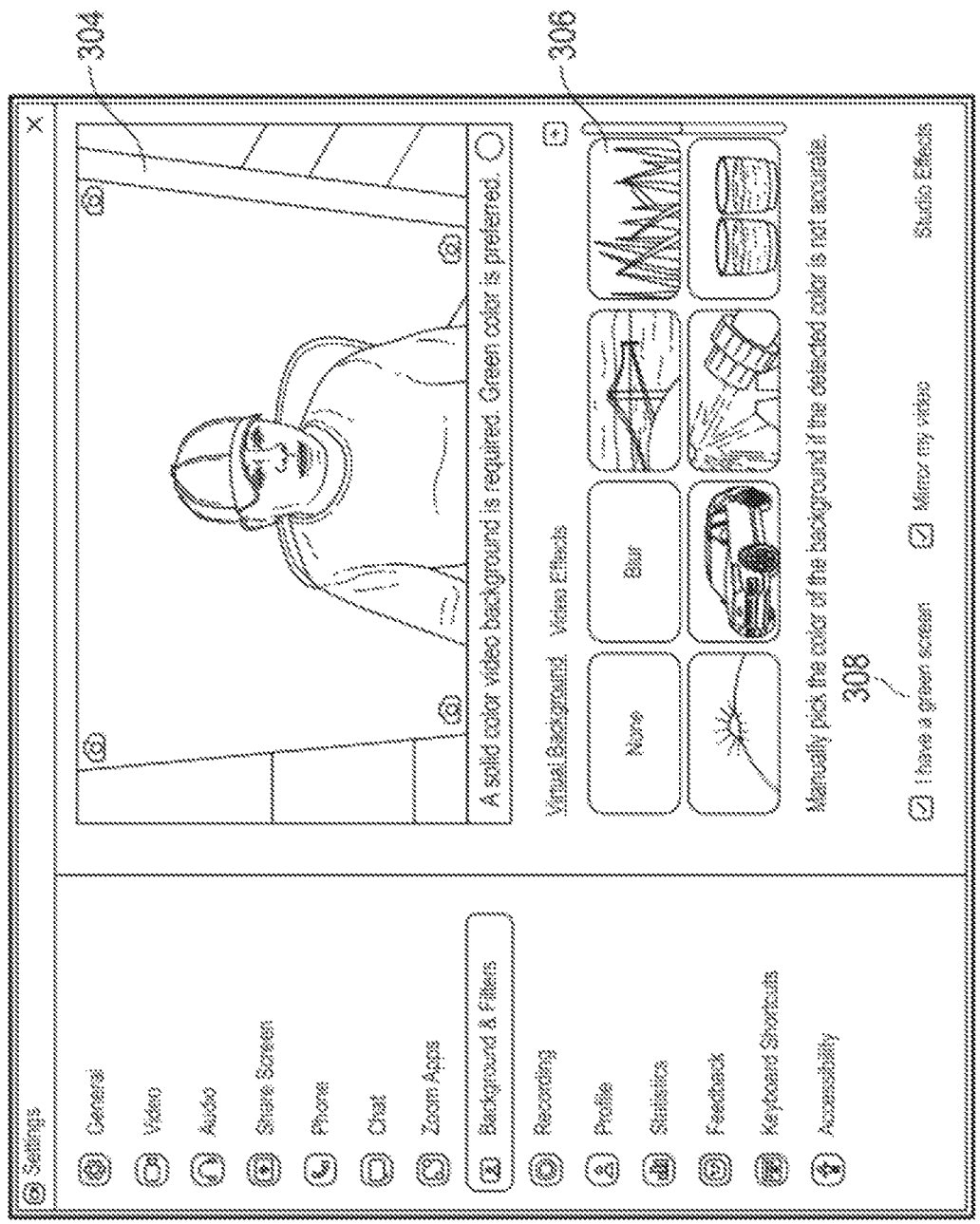
FIG. 3B is a diagram illustrating one example embodiment of requesting a virtual background to be displayed using chroma keying, according to some embodiments.

FIG. 3B is a diagram illustrating one example embodiment of requesting a virtual background to be displayed using chroma keying, according to some embodiments.

Within the illustration, the participant viewing the settings UI from FIG. 3A has navigated to the "Background & Filters" section of the settings UI to go to a Background & Filters UI screen. A preview window of the video feed 304 is displayed. Below the preview window, a number of virtual backgrounds 306 may be selected from by the participant. Below the selectable virtual backgrounds, an option labeled "I have a green screen" can be checked or unchecked by the participant. Here, the user has selected one of the virtual backgrounds, and has checked the "I have a green screen" option. Upon selecting both elements, the system automatically determines a background layer behind the participant, detects a color range for the background layer (i.e., light green to medium-dark green, from the green screen backdrop), and detects four edges for the background layer. Four camera icons are thus displayed within the preview window which represent automatically detected edges of the solid color background layer (i.e., the green screen) behind the participant. In some embodiments, the user may manually select a representative color of the background layer in order to assist the system with automatic detection of the background layer, the color range, and/or the edges of the background layer. In some embodiments, the user may manually drag the camera icons to desired locations to adjust the detected edges of the background layer.

Figure 3C:
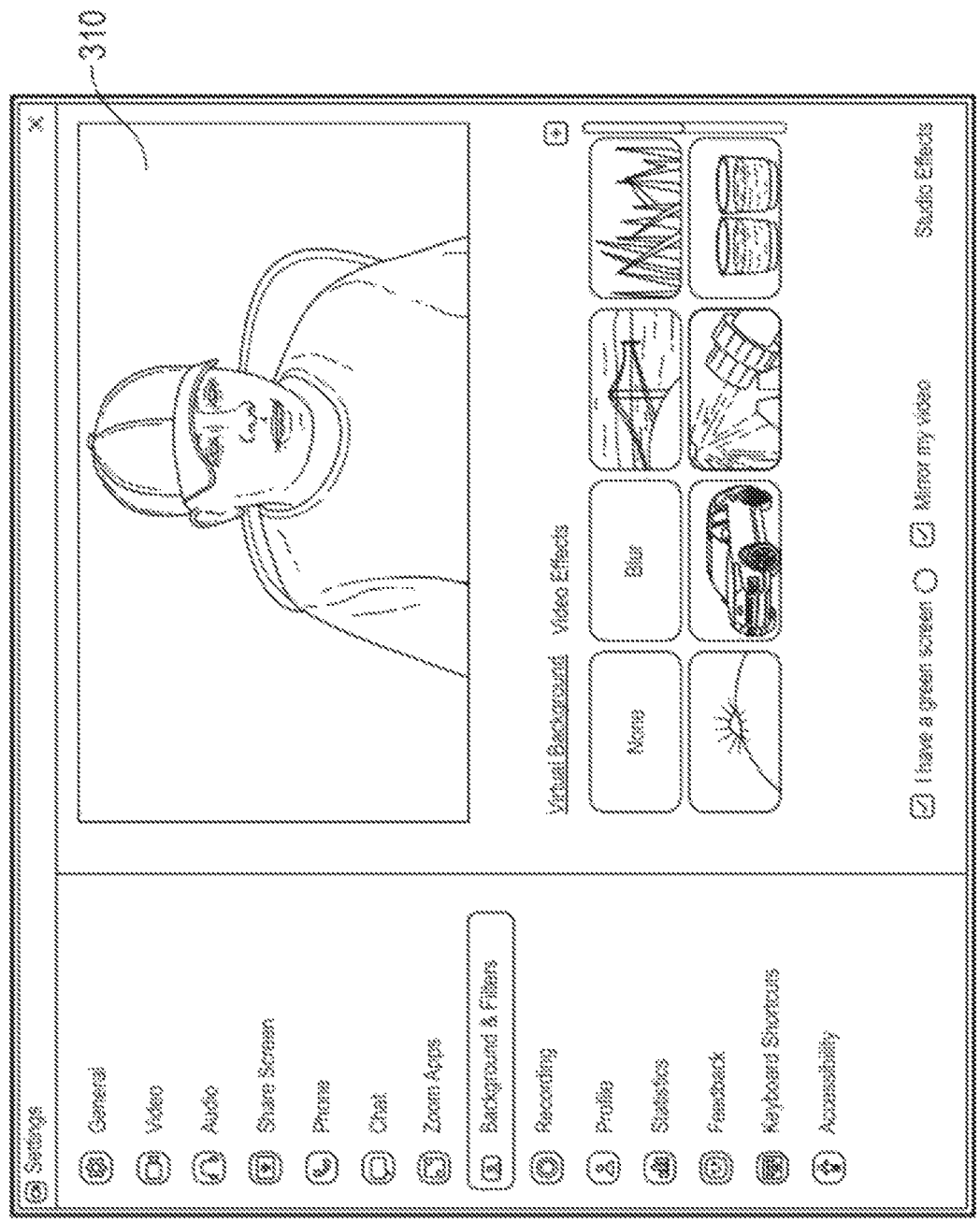
FIG. 3C is a diagram illustrating one example embodiment of cropping and reframing a video feed around a solid color background, according to some embodiments.

FIG. 3C is a diagram illustrating one example embodiment of cropping and reframing a video feed around a solid color background layer, according to some embodiments.

The illustrated image is similar to FIG. 3B, but now the system has detected the background layer, color range of the background layer, and edges of the background layer, and has proceeded to crop and reframe the video feed around the edges of the background layer. Thus, the video feed shown in the preview is now cropped, zoomed, and panned by the system to include only the solid color green screen backdrop behind the participant, with the participant at least partially centered within the frame to the extent possible. The participant has the opportunity to view this preview of how the green screen appears in the background layer before the system removes the green screen background layer, then adds the selected virtual background to the background layer of the video feed.

Figure 3D:
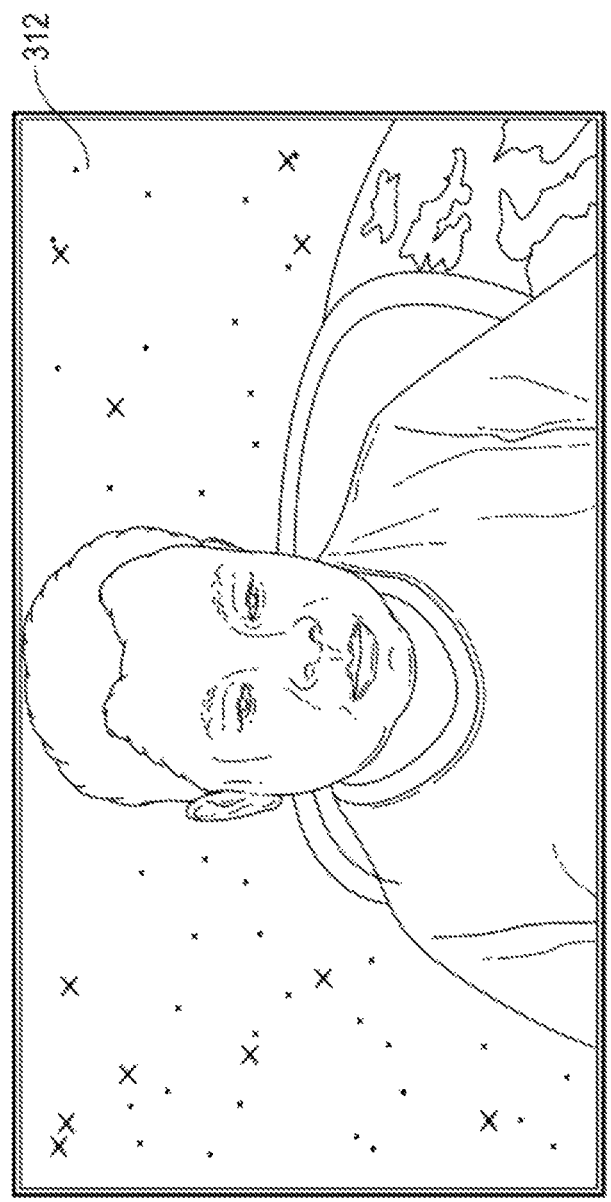
FIG. 3D is a diagram illustrating one example embodiment of displaying a video feed with a virtual background added, according to some embodiments.

FIG. 3D is a diagram illustrating one example embodiment of displaying a video feed with a virtual background layer added, according to some embodiments.

The illustrated image shows the video feed from FIG. 3C with the solid color green background layer replaced by a virtual background. In this case, the participant has selected a space-themed virtual background, and thus the space-themed virtual background appears with no errors or inconsistencies visible, i.e., no parts of the participant appear to incorrectly blend into the virtual background.

Figure 4:
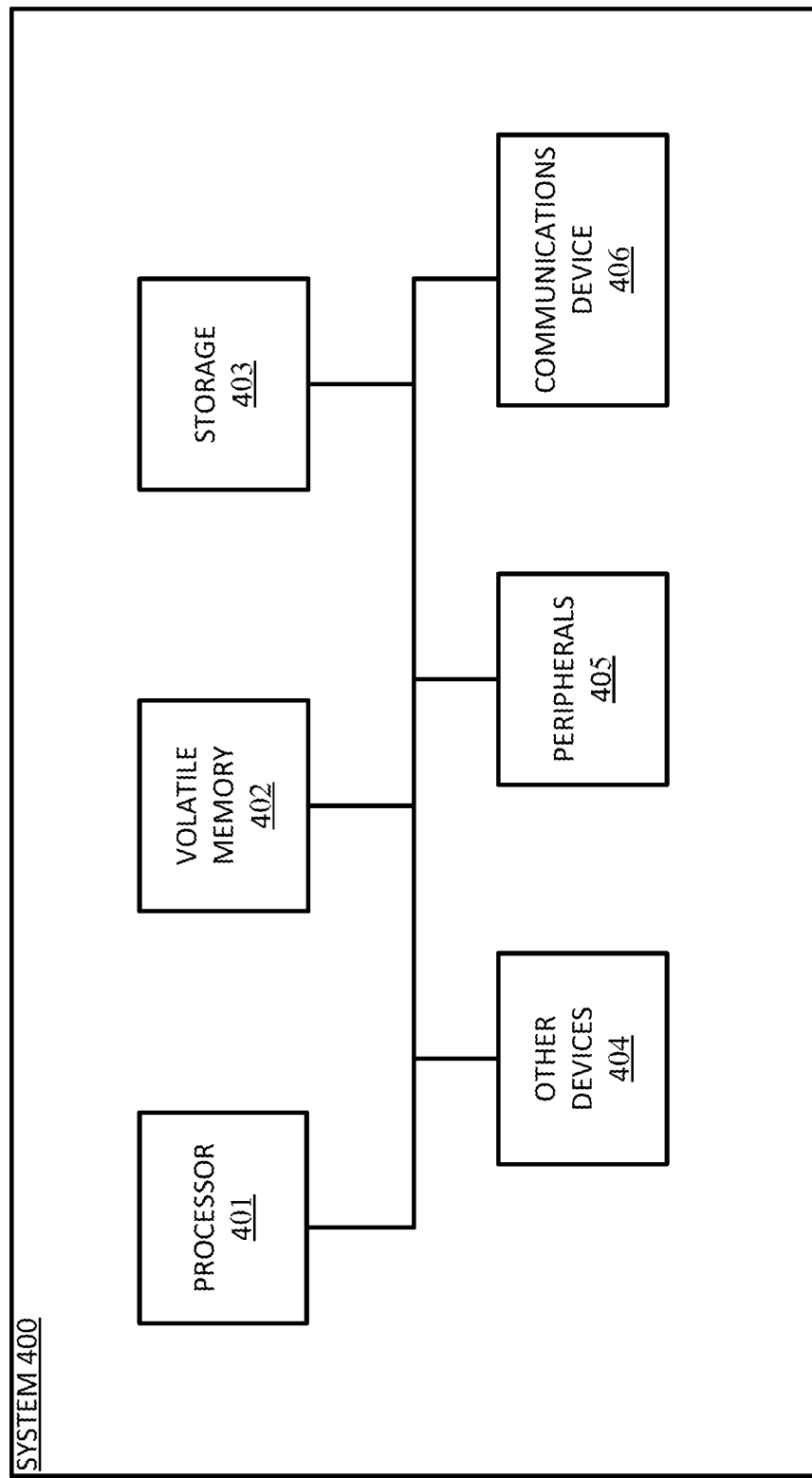
FIG. 4 is a diagram illustrating an exemplary computer that may perform processing in some embodiments.

FIG. 4 is a diagram illustrating an exemplary computer that may perform processing in some embodiments. Exemplary computer 400 may perform operations consistent with some embodiments. The architecture of computer 400 is exemplary. Computers can be implemented in a variety of other ways. A wide variety of computers can be used in accordance with the embodiments herein.

Processor 401 may perform computing functions such as running computer programs. The volatile memory 402 may provide temporary storage of data for the processor 401. RAM is one kind of volatile memory. Volatile memory typically requires power to maintain its stored information. Storage 403 provides computer storage for data, instructions, and/or arbitrary information. Non-volatile memory, which can preserve data even when not powered and including disks and flash memory, is an example of storage. Storage 403 may be organized as a file system, database, or in other ways. Data, instructions, and information may be loaded from storage 403 into volatile memory 402 for processing by the processor 401.

The computer 400 may include peripherals 405. Peripherals 405 may include input peripherals such as a keyboard, mouse, trackball, video camera, microphone, and other input devices. Peripherals 405 may also include output devices such as a display. Peripherals 405 may include removable media devices such as CD-R and DVD-R recorders/players. Communications device 406 may connect the computer 100 to an external medium. For example, communications device 406 may take the form of a network adapter that provides communications to a network. A computer 400 may also include a variety of other devices 404. The various components of the computer 400 may be connected by a connection medium such as a bus, crossbar, or network.

It will be appreciated that the present disclosure may include any one and up to all of the following examples.

Example 1. A method comprising: displaying, for each of a plurality of participants within a communication session, a user interface (UI) comprising at least one video feed corresponding to a participant of the communication session; receiving a request to enable a selected or provided virtual background using chroma keying; determining a background layer of the video feed; determining a plurality of edges for the background layer; cropping and reframing the video feed around the edges of the background layer; removing the background layer from the video feed; adding the selected or provided virtual background to the background layer of the video feed; and displaying the video feed within the communication session.

Example 2. The method of Example 1, wherein determining the background layer of the video feed comprises determining a color range for the background layer representing a solid continuous color or color gradient.

Example 3. The method of any of Examples 1-2, wherein determining the color range for the background layer comprises: receiving, via a color selection UI element, a selection of a solid color chosen from the background layer of the video feed; and determining a color range for the background layer based on the selection of the solid color.

Example 4. The method of any of Examples 1-3, wherein determining the background layer of the video feed comprises detecting one or more of: a solid continuous color, a color gradient, one or more repeated patterns, and one or more shapes.

Example 5. The method of any of Examples 1-4, wherein determining the background layer of the video feed comprises detecting the background layer of the video feed from one or more frames of the video feed.

Example 6. The method of any of Examples 1-5, wherein determining the plurality of edges for the background layer comprises detecting the plurality of edges based on the determined background layer of the video feed.

Example 7. The method of any of Examples 1-6, wherein determining the plurality of edges for the background layer comprises receiving, via an edge selection UI element, a selection of the plurality of edges for the background layer.

Example 8. The method of any of Examples 1-7, wherein the cropping and reframing of the video feed is performed such that the background layer represents a solid color, gradient, pattern, or shape with no irregularities.

Example 9. The method of any of Examples 1-8, further comprising: replacing one or more irregularities in the background layer with regular features of the determined background layer.

Example 10. The method of any of Examples 1-9, wherein reframing the video feed comprises automatically zooming into the video feed so that the edges of the video feed correspond to the determined edges of the background layer.

Example 11. The method of any of Examples 1-10, wherein the video feed is generated via a mobile device.

Example 12. The method of any of Examples 1-11, wherein reframing the video feed comprises panning within the frame of the video feed.

Example 13. The method of any of Examples 1-12, wherein removing the background layer of the video feed comprises: determining an outline around the participant within the video feed; and removing the determined background layer outside of the outline.

Example 14. A communication system comprising one or more processors configured to perform the operations of: displaying, for each of a plurality of participants within a communication session, a user interface (UI) comprising at least one video feed corresponding to a participant of the communication session; receiving a request to enable a selected or provided virtual background using chroma keying; determining a background layer of the video feed; determining a plurality of edges for the background layer; cropping and reframing the video feed around the edges of the background layer; removing the background layer from the video feed; adding the selected or provided virtual background to the background layer of the video feed; and displaying the video feed within the communication session.

Example 15. The communication system of Example 14, wherein determining the background layer of the video feed comprises determining a color range for the background layer representing a solid continuous color or color gradient.

Example 16. The communication system of any of Examples 14-15, wherein determining the color range for the background layer comprises: receiving, via a color selection UI element, a selection of a solid color chosen from the background layer of the video feed; and determining a color range for the background layer based on the selection of the solid color.

Example 17. The communication system of any of Examples 14-16, wherein determining the background layer of the video feed comprises detecting one or more of: a solid continuous color, a color gradient, one or more repeated patterns, and one or more shapes.

Example 18. The communication system of any of Examples 14-17, wherein determining the background layer of the video feed comprises detecting the background layer of the video feed from one or more frames of the video feed.

Example 19. The communication system of any of Examples 14-18, wherein determining the plurality of edges for the background layer comprises detecting the plurality of edges based on the determined background layer of the video feed.

Example 20. The communication system of any of Examples 14-19, wherein determining the plurality of edges for the background layer comprises receiving, via an edge selection UI element, a selection of the plurality of edges for the background layer.

Example 21. The communication system of any of Examples 14-20, wherein the cropping and reframing of the video feed is performed such that the background layer represents a solid color, gradient, pattern, or shape with no irregularities.

Example 22. The communication system of any of Examples 14-21, wherein the one or more processors are further configured to perform the operations of: replacing one or more irregularities in the background layer with regular features of the determined background layer.

Example 23. The communication system of any of Examples 14-22, wherein reframing the video feed comprises automatically zooming into the video feed so that the edges of the video feed correspond to the determined edges of the background layer.

Example 24. The communication system of any of Examples 14-23, wherein the video feed is generated via a mobile device.

Example 25. The communication system of any of Examples 14-24, wherein reframing the video feed comprises panning within the frame of the video feed.

Example 26. The communication system of any of Examples 14-25, wherein removing the background layer of the video feed comprises: determining an outline around the participant within the video feed; and removing the determined background layer outside of the outline.

Example 27. The communication system of any of Examples 14-26, wherein determining the background layer of the video feed comprises detecting the background layer of the video feed from one or more frames of the video feed.

Example 28. The communication system of any of Examples 14-27, wherein determining the color range for the background layer comprises: receiving, via a color selection UI element, a selection of a solid color chosen from the background layer of the video feed; and determining a color range for the background layer based on the selection of the solid color.

Example 29. The communication system of any of Examples 14-28, wherein determining the color range for the background layer comprises: detecting a color range for the background layer based on the colors of the background layer of the video feed.

Example 30. The communication system of any of Examples 14-29, wherein determining the plurality of edges for the background layer comprises detecting the plurality of edges based on the determined color range for the background layer.

Example 31. The communication system of any of Examples 14-30, wherein determining the plurality of edges for the background layer comprises receiving, via an edge selection UI element, a selection of the plurality of edges for the background layer.

Example 32. A non-transitory computer-readable medium containing instructions for providing a virtual background within a communication session, comprising: instructions for displaying, for each of a plurality of participants within a communication session, a user interface (UI) comprising at least one video feed corresponding to a participant of the communication session; instructions for receiving a request to enable a selected or provided virtual background using chroma keying; instructions for determining a background layer of the video feed; instructions for determining a plurality of edges for the background layer; instructions for cropping and reframing the video feed around the edges of the background layer; removing the background layer from the video feed; instructions for adding the selected or provided virtual background to the background layer of the video feed; and instructions for displaying the video feed within the communication session.

Example 33. The non-transitory computer-readable medium of Example 32, wherein determining the background layer of the video feed comprises determining a color range for the background layer representing a solid continuous color or color gradient.

Example 34. The non-transitory computer-readable medium of any of Examples 32-33, wherein determining the color range for the background layer comprises: receiving, via a color selection UI element, a selection of a solid color chosen from the background layer of the video feed; and determining a color range for the background layer based on the selection of the solid color.

Example 35. The non-transitory computer-readable medium of any of Examples 32-34, wherein determining the background layer of the video feed comprises detecting one or more of: a solid continuous color, a color gradient, one or more repeated patterns, and one or more shapes.

Example 36. The non-transitory computer-readable medium of any of Examples 32-35, wherein determining the background layer of the video feed comprises detecting the background layer of the video feed from one or more frames of the video feed.

Example 37. The non-transitory computer-readable medium of any of Examples 32-36, wherein determining the plurality of edges for the background layer comprises detecting the plurality of edges based on the determined background layer of the video feed.

Example 38. The non-transitory computer-readable medium of any of Examples 32-37, wherein determining the plurality of edges for the background layer comprises receiving, via an edge selection UI element, a selection of the plurality of edges for the background layer.

Example 39. The non-transitory computer-readable medium of any of Examples 32-38, wherein the cropping and reframing of the video feed is performed such that the background layer represents a solid color, gradient, pattern, or shape with no irregularities.

Example 40. The non-transitory computer-readable medium of any of Examples 32-39, further comprising:

instructions for replacing one or more irregularities in the background layer with regular features of the determined background layer.

Example 41. The non-transitory computer-readable medium of any of Examples 32-40, wherein reframing the video feed comprises automatically zooming into the video feed so that the edges of the video feed correspond to the determined edges of the background layer.

Example 42. The non-transitory computer-readable medium of any of Examples 32-41, wherein the video feed is generated via a mobile device.

Example 43. The non-transitory computer-readable medium of any of Examples 32-42, wherein reframing the video feed comprises panning within the frame of the video feed.

Example 44. The non-transitory computer-readable medium of any of Examples 32-43, wherein removing the background layer of the video feed comprises: determining an outline around the participant within the video feed; and removing the determined background layer outside of the outline.

Example 45. The non-transitory computer-readable medium of any of Examples 32-44, wherein determining the background layer of the video feed comprises detecting the background layer of the video feed from one or more frames of the video feed.

Example 46. The non-transitory computer-readable medium of any of Examples 32-45, wherein determining the color range for the background layer comprises: receiving, via a color selection UI element, a selection of a solid color chosen from the background layer of the video feed; and determining a color range for the background layer based on the selection of the solid color.

Example 47. The non-transitory computer-readable medium of any of Examples 32-46, wherein determining the color range for the background layer comprises: detecting a color range for the background layer based on the colors of the background layer of the video feed.

Example 48. The non-transitory computer-readable medium of any of Examples 32-47, wherein determining the plurality of edges for the background layer comprises detecting the plurality of edges based on the determined color range for the background layer.

Example 49. The non-transitory computer-readable medium of any of Examples 32-48, wherein determining the plurality of edges for the background layer comprises receiving, via an edge selection UI element, a selection of the plurality of edges for the background layer.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
   displaying, for each of a plurality of participants within a communication session, a user interface (UI) comprising at least one video feed corresponding to a participant of the communication session;
   receiving a request to enable a selected or provided virtual background using chroma keying;
   determining a background portion of the video feed, wherein the background portion of the video feed comprises portions of the video feed captured by a camera that do not include the participant;

determining a background layer of the video feed, wherein the background layer comprises a portion of the background portion;

determining a plurality of edges of the background layer;

cropping and reframing the video feed around the edges of the background layer;

removing the background layer from the video feed;

adding the selected or provided virtual background to replace the background layer of the video feed; and displaying the video feed within the communication session.

2. The method of claim 1, wherein determining the background layer of the video feed comprises determining a color range for the background layer representing a solid continuous color or color gradient.

3. The method of claim 2, wherein determining the color range for the background layer comprises:

receiving, via a color selection UI element, a selection of a solid color chosen from the background portion of the video feed; and determining a color range for the background layer based on the selection of the solid color.

4. The method of claim 1, wherein determining the background layer of the video feed comprises detecting one or more of: a solid continuous color, a color gradient, one or more repeated patterns, and one or more shapes.

5. The method of claim 1, wherein determining the background portion of the video feed comprises detecting the background portion of the video feed from one or more frames of the video feed.

6. The method of claim 1, wherein determining the plurality of edges for the background layer comprises detecting the plurality of edges based on the determined background portion of the video feed.

7. The method of claim 1, wherein determining the plurality of edges for the background layer comprises receiving, via an edge selection UI element, a selection of the plurality of edges for the background layer.

8. The method of claim 1, wherein the cropping and reframing of the video feed is performed such that the background layer represents a solid color, gradient, pattern, or shape with no irregularities.

9. The method of claim 1, further comprising:

replacing one or more irregularities in the background layer with regular features of the determined background portion.

10. The method of claim 1, wherein reframing the video feed comprises automatically zooming into the video feed so that the edges of the video feed correspond to the determined edges of the background layer.

11. The method of claim 1, wherein the video feed is generated via a mobile device.

12. The method of claim 1, wherein reframing the video feed comprises panning within a frame of the video feed.

13. The method of claim 1, wherein removing the background layer of the video feed comprises:

determining an outline around the participant within the video feed; and removing the determined background portion outside of the outline.

14. A communication system comprising one or more processors configured to perform operations of:

displaying, for each of a plurality of participants within a communication session, a user interface (UI) comprising at least one video feed corresponding to a participant of the communication session;

receiving a request to enable a selected or provided virtual background using chroma keying;

determining a background portion of the video feed, wherein the background portion of the video feed comprises portions of the video feed captured by a camera that do not include the participant;

determining a background layer of the video feed, wherein the background layer comprises a portion of the background portion;

determining a plurality of edges of the background layer;

cropping and reframing the video feed around the edges of the background layer;

removing the background layer from the video feed;

adding the selected or provided virtual background to replace the background layer of the video feed; and displaying the video feed within the communication session.

15. The communication system of claim 14, wherein determining the background layer of the video feed comprises detecting the background layer of the video feed from one or more frames of the video feed.

16. The communication system of claim 14, wherein the one or more processors are further configured to perform operations of:

receiving, via a color selection UI element, a selection of a solid color chosen from the background portion of the video feed; and determining a color range for the background layer based on the selection of the solid color.

17. The communication system of claim 14, wherein the one or more processors are further configured to perform operations of:

detecting a color range for the background layer based on colors of the background portion of the video feed.

18. The communication system of claim 16, wherein determining the plurality of edges for the background layer comprises detecting the plurality of edges based on the determined color range for the background layer.

19. The communication system of claim 14, wherein determining the plurality of edges for the background layer comprises receiving, via an edge selection UI element, a selection of the plurality of edges for the background layer.

20. A non-transitory computer-readable medium containing instructions for providing a virtual background within a communication session, comprising:

instructions for displaying, for each of a plurality of participants within a communication session, a user interface (UI) comprising at least one video feed corresponding to a participant of the communication session;

instructions for receiving a request to enable a selected or provided virtual background using chroma keying;

instructions for determining a background portion of the video feed, wherein the background portion of the video feed comprises portions of the video feed captured by a camera that do not include the participant;

instructions for determining a background layer of the video feed, wherein the background layer comprises a portion of the background portion;

instructions for determining a plurality of edges of the background layer;

instructions for cropping and reframing the video feed around the edges of the background layer; removing the background layer from the video feed;

instructions for adding the selected or provided virtual background to replace the background layer of the video feed; and instructions for displaying the video feed within the communication session.

\* \* \* \* \*